FIG. I

INVENTOR.
LESLIE E. SODERQUIST
BY
ATTORNEYS

INVENTOR.
LESLIE E. SODERQUIST

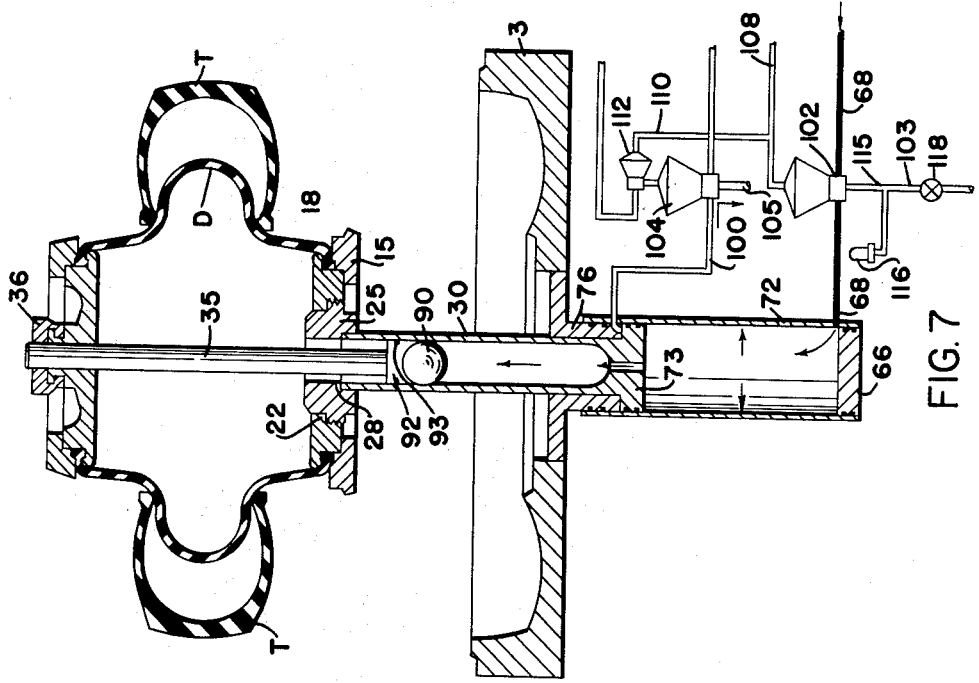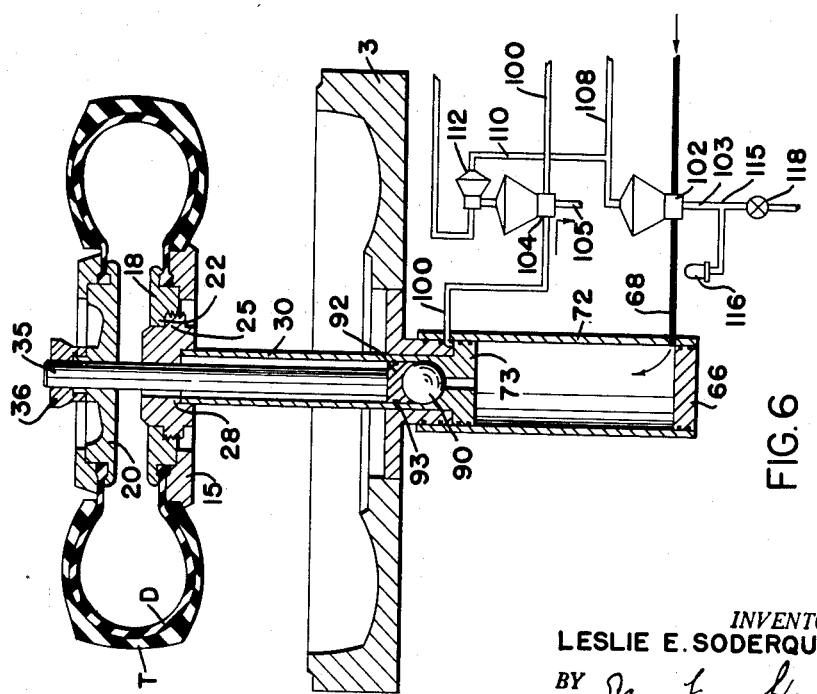

INVENTOR.
LESLIE E. SODERQUIST
BY Ely, Frye & Hamilton
ATTORNEY

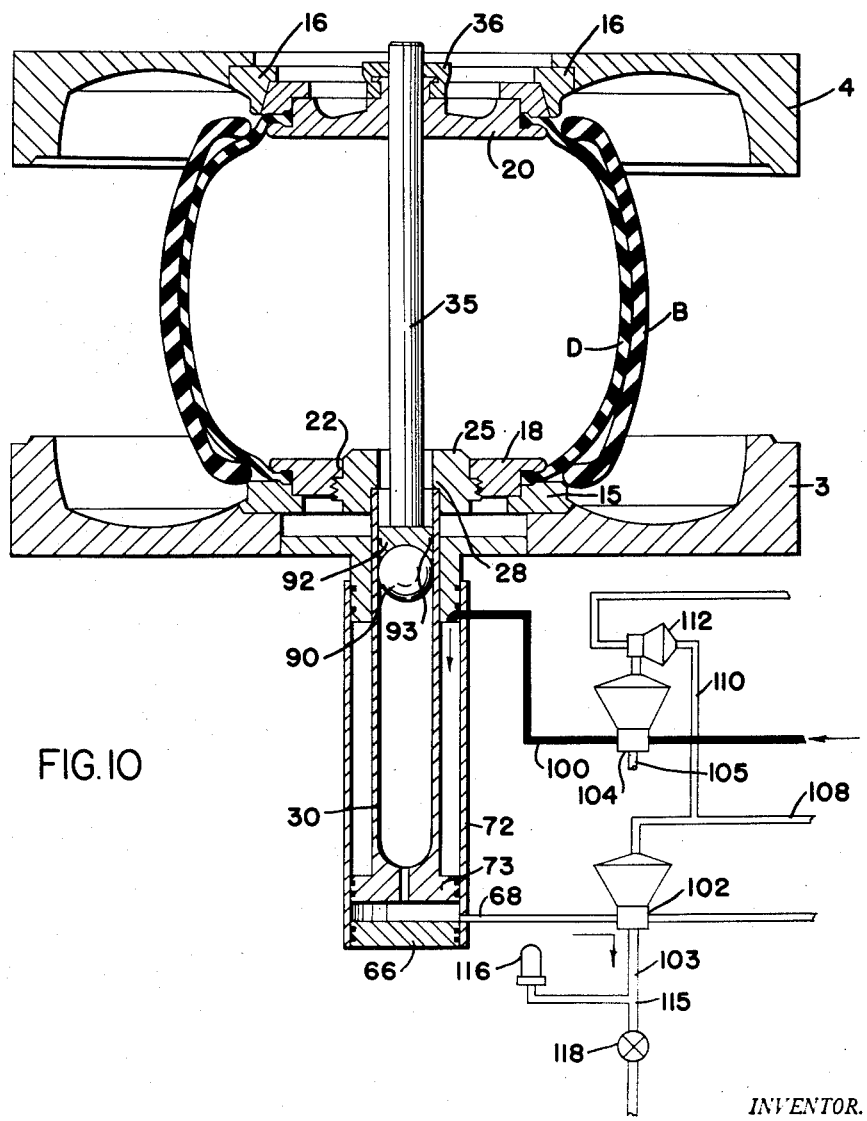

Jan. 1, 1957

L. E. SODERQUIST 2,775,789

DIAPHRAGM OPERATING MECHANISM FOR TIRE
SHAPING AND VULCANIZING PRESSES

Filed Sept. 29, 1953

*INVENTOR.*
LESLIE E. SODERQUIST
BY Ely, Frye & Hamilton

ATTORNEYS

United States Patent Office 2,775,789
Patented Jan. 1, 1957

2,775,789

DIAPHRAGM OPERATING MECHANISM FOR TIRE SHAPING AND VULCANIZING PRESSES

Leslie E. Soderquist, Akron, Ohio, assignor to The McNeil Machine & Engineering Company, Akron, Ohio, a corporation of Ohio Application September 29, 1953, Serial No. 382,998

7 Claims. (Cl. 18—17)

The present invention relates to the construction and operation of presses for shaping and vulcanizing pneumatic tires, which presses are characterized by the presence of a diaphragm as a permanent part of the press and by which the tire is shaped and on which it is cured. Presses of this type have been perfected by the present applicant and are shown in his prior Patents Nos. 2,495,663 and 2,495,664, issued January 24, 1950. Due to the work done by the present applicant this type of press is now well known in the art.

The present invention provides new and improved mechanisms to manipulate the diaphragm both during the shaping of the unvulcanized tire band to tire shape with the closing of the press and the stripping of the tire from the diaphragm after vulcanization is completed and while the press is opening.

The object of the present invention is to improve upon and simplify the operations attendant upon the manipulation of the diaphragm or "bag" as it is more commonly called. In presses of applicant's former design, the manipulation of the diaphragm has been primarily mechanical and by the use of cams, levers and the like operated by the opening and closing movements of the press. In the mechanism shown herein the mechanically moving parts have been replaced by fluid pressure operated devices. This not only makes the construction of these presses simpler and more economical, but the operation is more efficient and less likely to get out of order. The press is more compact and is improved in many ways.

The invention is shown in its best known and perfected form, it being appreciated, however, that changes, modifications and improvements may be made without in any way varying the basic features of the invention or affecting the scope of the claims appended hereto.

The mechanism for opening and closing the press has not been shown as any well known mechanism may be used for those operations. While the preferred form of mold manipulation is to raise and lower the mold in a straight line during those portions of the cycle in which the diaphragm is being operated and then to tilt the mold section during the balance of the closing or opening movement, this is not necessary as the movable mold section, which is preferably the upper mold section, may move in a straight line throughout its entire cycle. The press may be of the type utilizing a steam dome or the molds may be chambered, or the press platens may be chambered for steam circulation.

A press of this type is set up so that the cycle of operations proceeds automatically and time controlled mechanisms are employed for that purpose. None of those well known devices are shown or described, it being understood that when the operator has placed an unvulcanized tire band in the press he will press a button and the press will close, and steam or water under pressure and at a temperature to shape and cure the tire will be admitted to the diaphragm. When the time cycle is completed, the steam or water is released from the diaphragm, the mold opens, and the diaphragm operating mechanism goes through its cycle during the opening of the press.

In presses of the type designed by the present applicant, pivoted tire stripping arms are moved beneath the tire during the opening of the press so that the newly vulcanized tire is supported and held while the diaphragm is stripped therefrom. Stripping arms of the type referred to are shown in applicant's prior Patent No. 2,495,664 and hence the mounting thereof and the means for operating the arms are not shown in this application.

In the drawings, in which the invention is shown in such detail as to enable it to be fully understood, Fig. 1 is a vertical section through a vulcanizing press of the type to which the present invention is adapted, the showing being limited to such parts thereof as are necessary to a complete understanding of the present invention. The press shown is of the steam dome type and is shown closed with the tire as during vulcanization.

Figs. 5 to 10, inclusive, are schematic views showing the complete cycle of the diaphragm mechanism. In these views the control mechanisms for the various parts of the diaphragm operating mechanism are shown.

Figure 5:
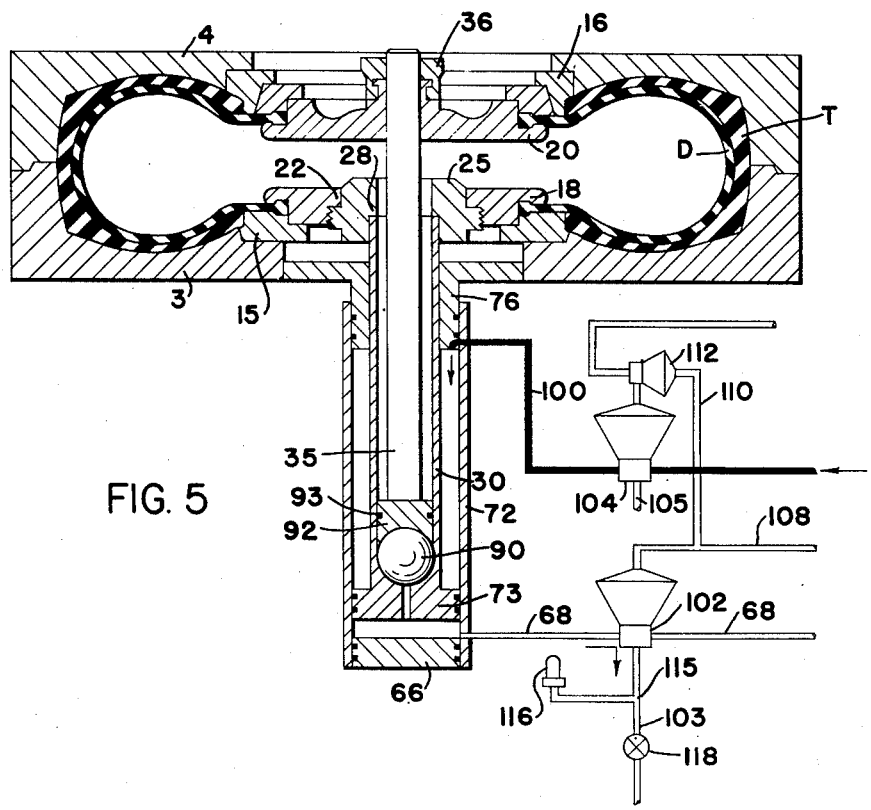

Fig. 5 shows the parts during the curing of the tire.

Fig. 6 shows the press fully opened at the end of the cure with the tire stripped from the bottom mold section and the diaphragm still within the tire.

Fig. 7 shows the start of the diaphragm stripping operation, the diaphragm being partially stripped from the tire by the upward movement of the upper diaphragm ring.

Figure 8:
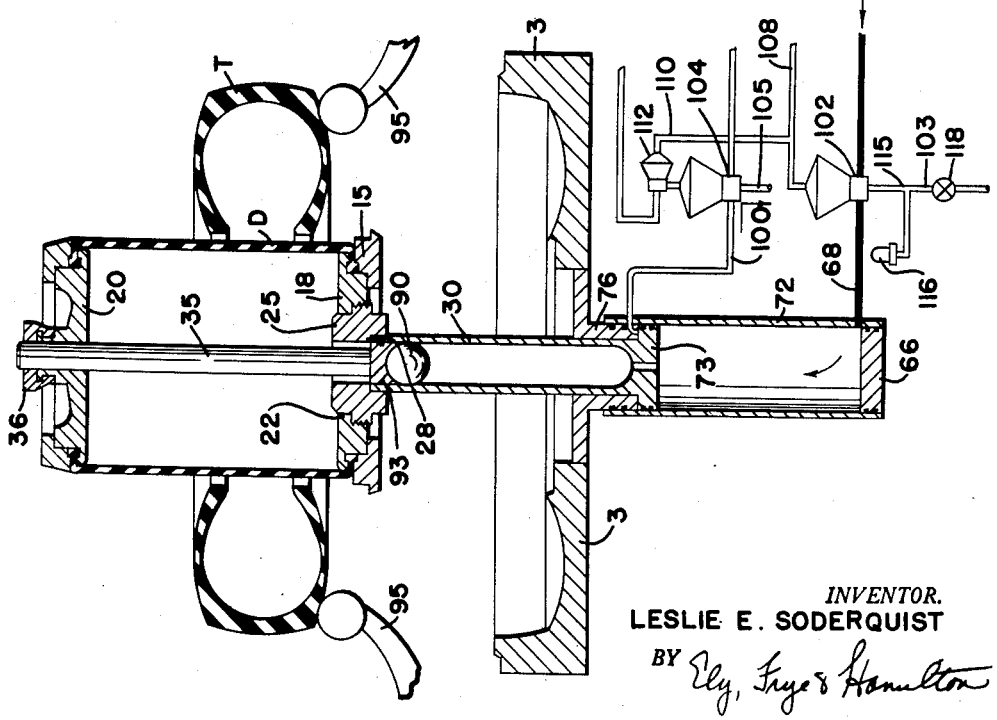

Fig. 8 shows the diaphragm fully stripped from the tire, the tire stripping arms having moved into place.

Figure 9:
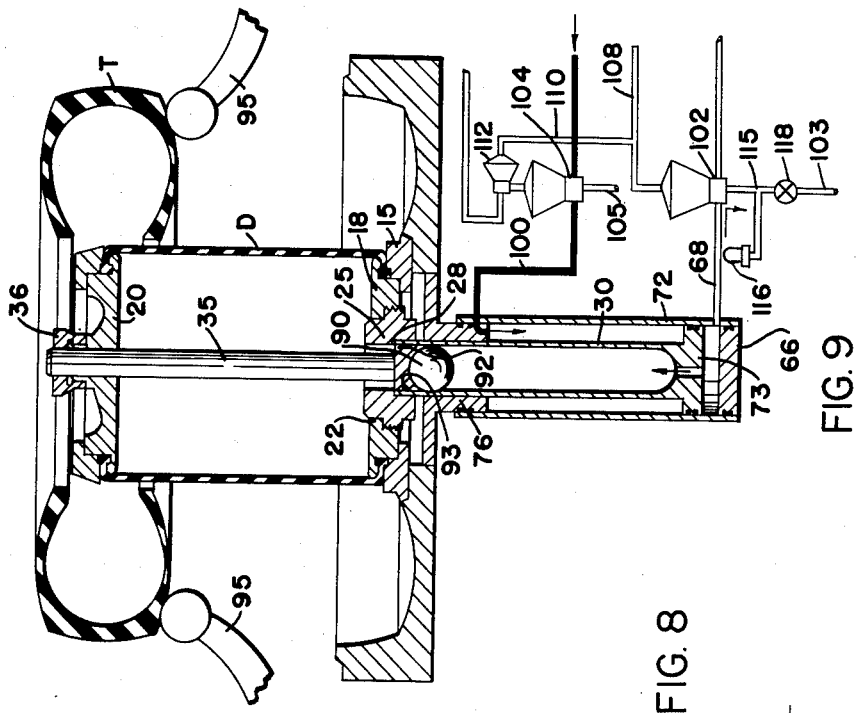

Fig. 9 shows the diaphragm assembly lowered.

Fig. 10 shows the uncured band placed over the diaphragm, and the band at the start of the shaping operation.

Figure 11:
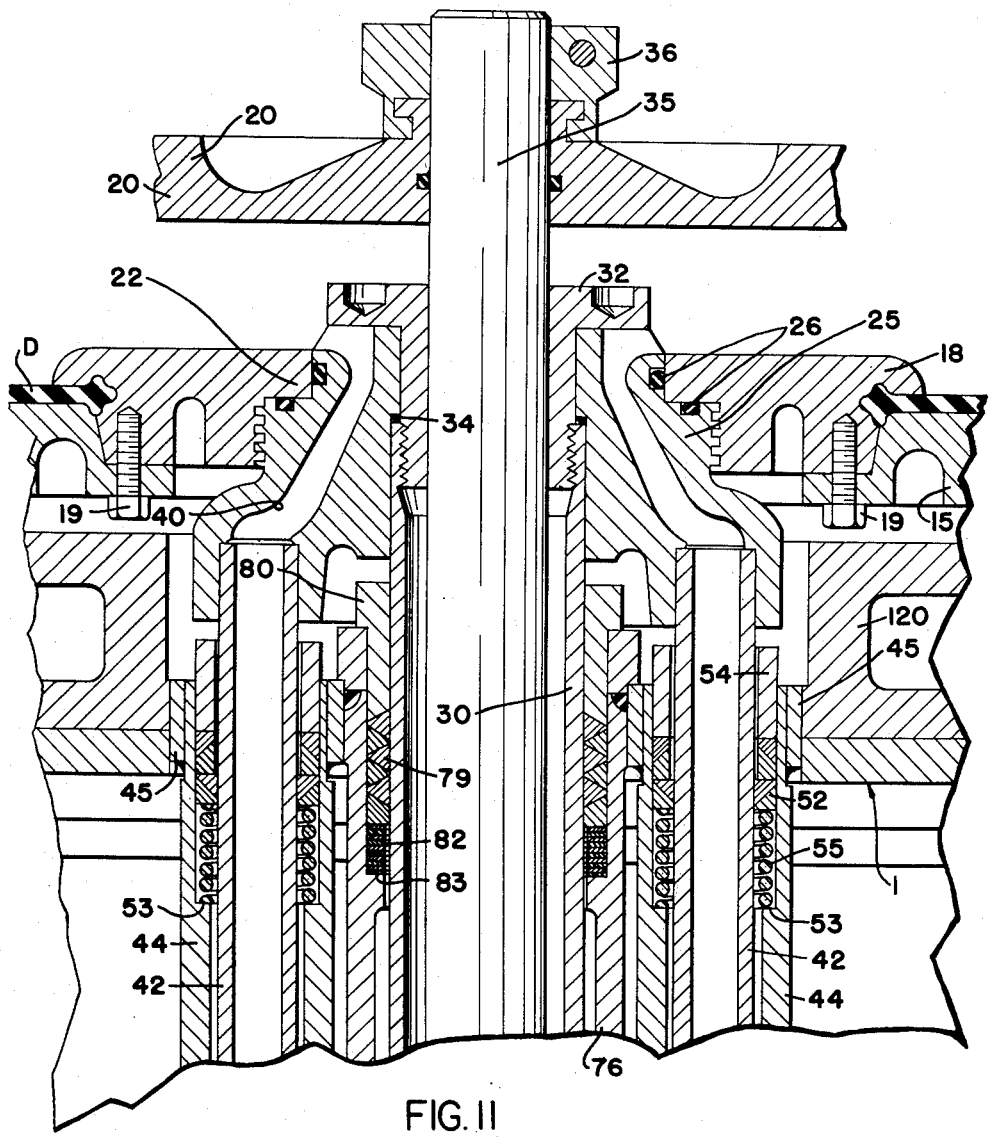

Fig. 11 shows in enlargement the top of the diaphragm operating cylinder. In this view the press is modified for a steam heated platen.

Figure 1:
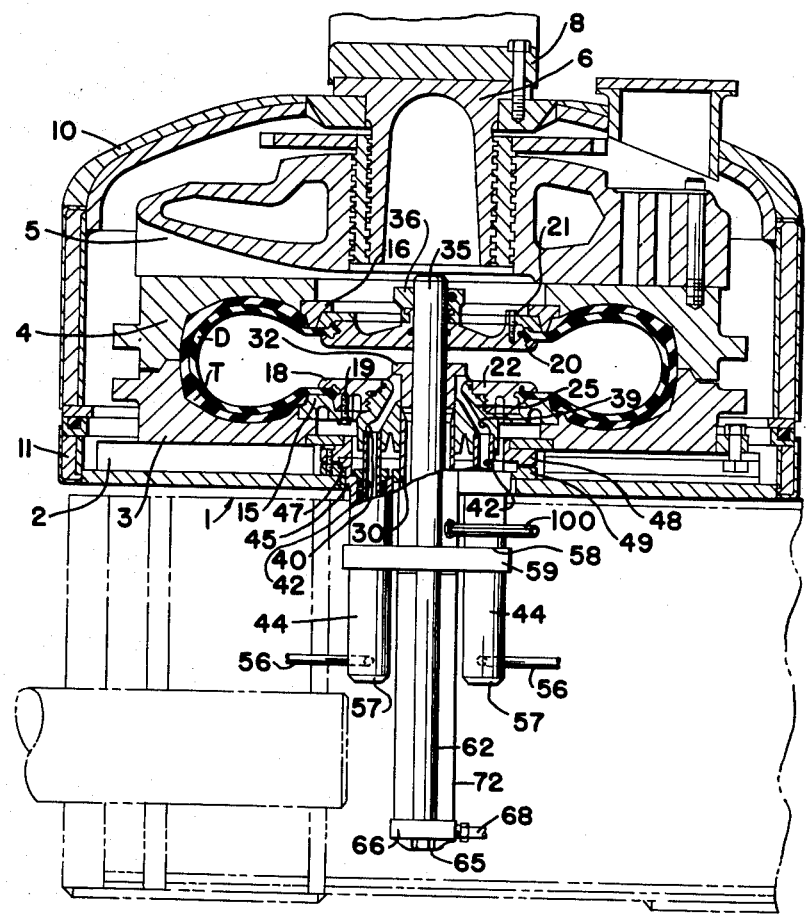

Referring particularly to Fig. 1, the bed plate of the press is shown at 1, to the top of which are attached the radial supports 2 to which the lower mold section 3 is secured. The upper mold section 4 is suspended from the upper platen 5 which is mounted for vertical adjustment on the central support 6, which is in turn attached to the movable cross head 8. The cross head 8 is raised and lowered by any suitable mechanism as has been stated, it being necessary that during the end of the closing operation (and the beginning of the opening movement) the cross head be moved in a vertical plane so that the upper mold 4 be in parallelism with the lower mold 3 while the tire is being shaped and the diaphragm deformed.

The mold assembly is shown as surrounded by the steam dome 10 carried by the upper cross head and making steam tight contact with the ring 11 attached to the bed of the press when the press is closed.

In the lower mold section is seated the lower bead ring 15, the periphery of which is shaped to fit the base and the lower outer edge of the tire T. The upper bead ring 16 is seated in the upper half of the mold and fits around the upper tire bead.

The diaphragm or bag D is of the well known rubber composition so that it will be expanded by the fluid pressure admitted to its interior during the shaping and curing. The edges of the bag are molded with beads which are clamped to the upper and lower bead rings. The lower edge of the diaphragm is clamped to the lower bead ring through a diaphragm plate in the form of a ring 18 held in place by bolts 19. The upper edge of the diaphragm is clamped to the upper bead ring through a diaphragm plate in the form of a ring 20 and held in place by bolts 21.

The inner surface of the ring 18 is threaded through a portion of its depth and is provided with an overhanging ledge 22 and is threaded upon and fitted over the top of a cap member 25, the mating surfaces being sealed with O-rings 26. The cap is provided with an internal flange 28 which registers with the top of a long cylinder 30 on which it is held by a gland 32, the upper part of which overlies the cap 25 and the stem of which is threaded into the top of the cylinder 30, a gasket 34 sealing the joint at this point. The cylinder 30 is part of the diaphragm manipulating apparatus which will be described. In its vertical movements it carries the lower diaphragm ring 18.

Located in the cylinder 30 and slidably mounted in the gland 32 is the piston rod 35 to the upper end of which is fixed, by the split clamping collar 36, the upper diaphragm ring 20. The piston rod 35 is the second part of the diaphragm manipulating apparatus and carries the upper diaphragm ring in its vertical movements.

The cap member 25 is provided with the vertical passages 39 and 40, the upper ends of which communicate with the space between the diaphragm rings and hence with the interior of the diaphragm. It is through these passages that steam and water are admitted to and circulated through the interior of the diaphragm to expand the diaphragm and to hold the tire against the mold.

The fluids under pressure are supplied to and withdrawn from passages 39 and 40 through long pipes 42 set in the lower ends of the passages and telescopingly received in long cylindrical chambers 44. The upper ends of the cylinders 44 are fitted in and welded to a plate 45 located in an opening in the bed plate of the press. The upper edge of plate 45 is provided with an overhanging ledge 47 which is received and held between two rings 48 and 49 bolted to the bed plate at 50. A packing 51 seals the space around the outside of the plate 45.

The space between each cylinder 44 and pipe 42 is packed, so as to allow the pipe to move in and out of the cylinder with the lower diaphragm ring without leaking, with packing 52 held between a collar 54 fitted in the upper end of the cylinder and a coil spring 55 seated on a ledge 53 below the top of the cylinder. Inlet and outlet conduits 56 provide the supply and drain for the fluid pressure and plugs 57 seal off the lower ends of the chambers. The chambers 44 are supported by shoulders 58 which rest upon an intermediate shelf or support 59 in which they are seated.

Resting on the plate 45 is a ring 60 through which pass bolts 61 which are threaded into the upper ends of two long vertical tie rods 62 located between the cylinders 44. The shelf 59 is closely fitted to a midway point on these tie rods. To the lower ends of the tie rods is attached by bolts 65 a base plate 66 which carries the diaphragm operating mechanism. Set in the plate 66 is the fluid pressure supply pipe 68 which discharges into a well 74 and supplies the pressure to raise the diaphragm rings.

Fitted over a central boss 70 on the plate 66 is a cylinder 72 slidably mounted in which is a piston 73. Pressure admitted through the pipe 68 and into the well 74 in the plate 66 will raise the piston to its extreme upper limit, which is determined by the location of a sleeve 76, the lower end of which fits in the shelf 59 and the upper end of which is fitted in an opening in the plate 45 to which it is bolted. Between the upper end of the sleeve 76 and the cylinder 30 are the packing glands 79 which are compressed between a ring 80 fitting around the cylinder 30 and spring rings 82 resting upon a shoulder 83 formed on the interior of the sleeve 76.

The lower end of the cylinder 30 is received in a recess in the top of the piston 73, and is threaded to a plug 85 which is fastened to the piston 73 by the bolts 86. It will be seen that when pressure is admitted to the well 74 in the base 66, the piston 73 will be raised, carrying with it the cylinder 30, the cap member 25, and the lower diaphragm ring 18.

Attention is called to the passage 88 through the axis of the piston 73 and the aligned passage 89 through the plug 85. These passages permit fluid under the pressure to pass from the well 74 to the interior of the cylinder 30.

The upper side of the plug 85 is concave so as to provide a seat for a ball-type piston 90 which is movable in the cylinder 30. This element 90 is a ball, preferably made of butyl rubber having a close sliding fit with the interior of the cylinder 30. Overlying the ball piston is a piston block 92 in the upper side of which is threaded the lower end of the piston rod 35. The underside of the block 92 is concaved to fit the top of the ball piston. Located in the block 92 is a piston ring 93 which is made of stainless steel and whose function is to scrape and keep clean the interior surface of the cylinder 30.

The particular arrangement of the ball piston is especially desirable because under pressure the ball will tend to be compressed, making a flattened sliding contact surface with the interior of the cylinder. The butyl rubber is non-permeable, so that the water, which is the fluid pressure preferably used, will not leak through the piston. Also, the steam within the tire will condense and collect on top of the block 92, making an excellent lubricant for the ball piston and protecting it from the direct effects of the steam. It will be understood that while butyl rubber is the preferred material from which the ball should be made, any plastic material of similar properties may be employed. Natural rubber may be used and various types of synthetic rubbers. It will be understood that when the words "rubber" or "rubber-like" are used in the claims, it is intended to cover butyl rubber as well as other rubber-like materials adaptable for the purpose.

It will also be noted that the area of the piston 73 is substantially greater than the cross-sectional area of the ball 90. As a result, as fluid pressure is admitted to the lower end of the cylinder 72 the first action will be to raise the piston 73 to the upper limit of its movement, raising the entire diaphragm assembly from the position shown in Fig. 5 to that shown in Fig. 6. This action will take place after the upper mold section has been raised by the press operating mechanism and will strip the tire from the lower mold section 3.

As the piston 73 reaches the upper limit of its travel, as shown in Fig. 6, the fluid pressure entering the cylinder 30 through the passages 88 and 89 will raise the ball piston 90 and with it the upper diaphragm ring 20, which is now separated from the lower diaphragm ring which remains elevated by the pressure in the cylinder 72. This initiates the stripping of the diaphragm from the tire as shown in Fig. 7. The upward motion of the diaphragm tends to carry the tire upward with it, but at this point the tire stripping arms 95 are moved inward beneath the tire and then upwardly, supporting the tire and assisting in the final stripping operation, as shown in Fig. 8.

Fig. 8 shows the final stripping of the tire with the diaphragm assembly raised to its full height and the upper and lower diaphragm rings spread to their maximum extent, holding the diaphragm extended and in substantially cylindrical form. The tire is supported on the arms 95 and the diaphragm is ready to be lowered.

The lowering of the diaphragm assembly is shown in Fig. 9. During this operation the diaphragm must remain extended, which requires that the ball piston 90 be fully extended in the cylinder 30 until the lower diaphragm ring 18 and the lower bead ring 15 are fully seated in the lower mold section 3.

In order to accomplish this purpose, sufficient pressure is maintained against the lower side of the ball piston 90 to maintain it at the top of the cylinder 30 until the whole assembly is lowered, as will be explained with particular reference to Figs. 5 to 9, inclusive.

It will be observed that the press is equipped with two pressure lines, one of which is the line 68 which enters the base 66 in the lower end of the cylinder 72. The other line 100 is connected to the top of the cylinder 72 through the sleeve 76. Water under pressure admitted to the assembly through the line 68 will raise the piston 73 and the entire assembly from the position shown in Fig. 5 to that shown in Fig. 6, and will then raise the upper diaphragm ring to the position shown in Fig. 8. At the end of the diaphragm stripping operation, water admitted to the top of cylinder 72 will force the piston 73 downwardly to the position shown in Fig. 9. However, in order to keep the ball piston elevated as shown in Fig. 9, the pressure within the cylinder 30 should be maintained at a sufficient degree to support the upper diaphragm ring and keep it from descending.

In Figs. 5 to 10, inclusive, where the pressure lines are supplying pressure, they are shown in solid lines, whereas when they are discharging they are shown in open lines. In the line 68 there is located a standard form of three-way diaphragm valve 102 which in one position will connect the source of pressure to the lower end of the cylinder 72 and in the other position will discharge the fluid in the cylinder 72 to the line 103. In the line 100 is a second three-way diaphragm valve 104 which either admits fluid pressure to the upper end of the cylinder 72 or discharges it to the line 105. The diaphragm valve 102 is operated by air pressure admitted through the line 108. A branch line 110 leads from the line 108 to an auxiliary diaphragm valve 112 which actuates the diaphragm valve 104. By this arrangement the valves 102 and 104 operate alternately, i. e., when the valve 104 is admitting water to the top of the cylinder 72, the valve 102 is releasing the pressure from the bottom of the cylinder. This will be seen by comparing the flow of pressure into and out of the cylinder as shown in Figs. 5 to 10, inclusive.

To maintain the ball piston 90 at the top of the inner cylinder 30 while the assembly is moving downward under pressure admitted through the line 100, about 100 lbs. pressure is normally required in the cylinder 30. In order to maintain this pressure there is located in the discharge line 103 a standard relief valve 116 which is located in line 103 at connection 115 and which is regulated so that it will remain closed against pressures less than that selected. The pressure in the line 100 is substantially greater than the selected pressure of say 100 lbs., so that the whole diaphragm assembly will be lowered while the piston 90 is still held in extended position. A hand valve 118 is located in the line 103 so that this line may be closed when the press is idle or when the diaphragm is to be replaced.

After the tire is removed from the press and the arms 95 are lowered, the operator will place an uncured tire band B in the press, telescoping it over the extended diaphragm. He now presses the starter button and the upper half of the mold begins its downward movement. Just before it comes into contact with the upper bead ring 16, it has turned into parallelism with the lower mold section. Shortly thereafter, it will mate with the upper bead ring 16 as shown in Fig. 10 and its continued downward movement will press the beads of the tire together, forcing water out of the cylinder 30. In conjunction with the fluid pressure admitted to the diaphragm, the tire will be shaped and the mold sections will come together around the tire as shown in Figs. 1 and 5.

On completion of the cure the press will reverse and the removal of the tire and the stripping of the diaphragm will proceed as described.

The construction and mode of operation will have been understood from the foregoing, it being sufficient to state that the whole operation takes place smoothly and efficiently, and all that is required of the operator is to place the uncured band over the diaphragm and seat the lower bead in the lower bead ring. He then presses a button and the press closes, shaping the tire. After the cure, the press opens automatically, the tire is stripped from the diaphragm, and the operator removes the finished tire. An operator may take care of a whole battery of presses which will be set to open in series.

Figure 2:
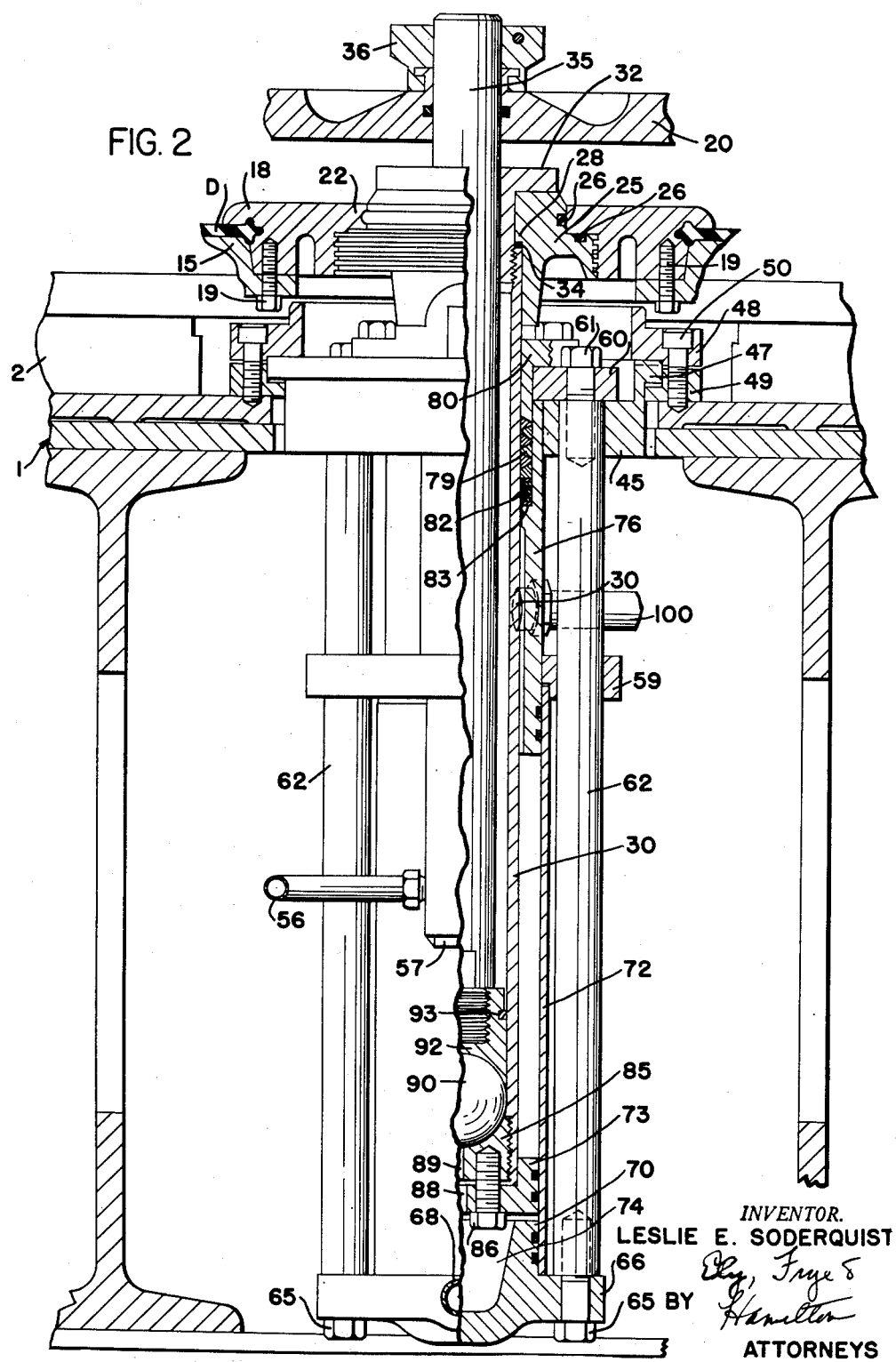
Fig. 2 is a view partly in vertical section and partly in elevation of the diaphragm operating mechanism while in the same position as in Fig. 1, the view being taken in a plane at right angles to Fig. 1.
Figure 3:
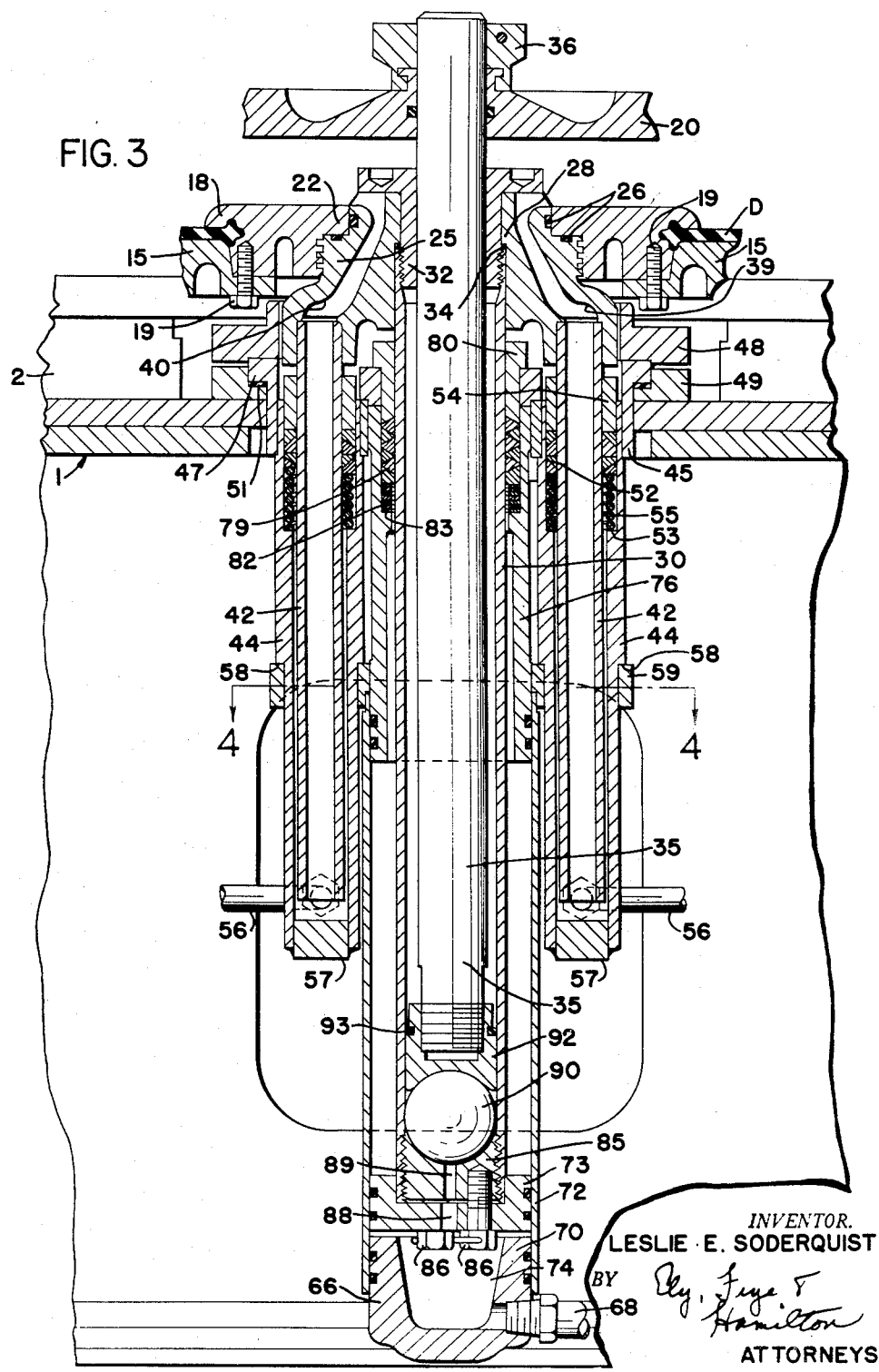
Fig. 3 is a vertical section of the same parts on the plane of Fig. 1.
Figure 4:
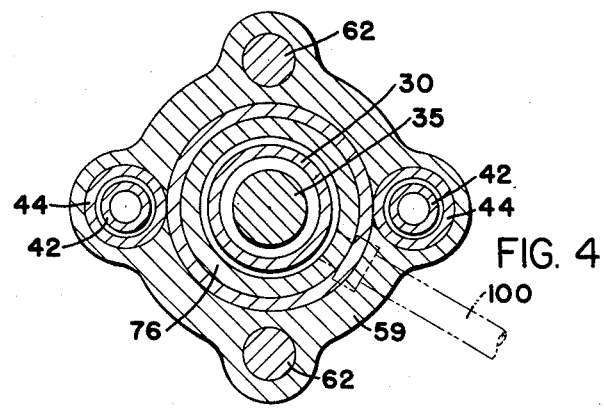
Fig. 4 is a horizontal section on the line 4—4 of Fig. 3.

In Fig. 11, the supports 2 have been replaced by the steam chambered platen 120, to which the lower mold section 3 will be attached, and the plate 45 has been modified as will be seen by comparing Fig. 11 with Figs. 2 and 3. A similar change will be made in the mounting of the upper mold section.

What is claimed is:

1. In a diaphragm tire shaping and vulcanizing press having mating mold sections, a flexible diaphragm, diaphragm plates connected to the edges of the diaphragm, a cylinder having a piston connected to one of said plates and a second cylinder coaxial with the first cylinder and having a second piston connected to the other plate, means to admit fluid pressure to the first cylinder to raise both pistons concurrently in the same direction to strip the tire from a mold section, and means operative thereafter to admit fluid pressure to the second cylinder to separate the plates and strip the diaphragm from the tire.

2. In a press for shaping and curing pneumatic tires, a diaphragm, upper and lower diaphragm rings attached to the edges of the diaphragm, a cylinder, a piston in the cylinder, a second cylinder carried by the aforesaid piston and a second piston in the second cylinder, the lower diaphragm ring being connected to the first piston and the upper diaphragm ring being connected to the second piston, means to admit fluid pressure to the first cylinder to raise both pistons concurrently, means to admit fluid pressure to the second cylinder to raise the second piston after the first piston has moved to the end of its travel, and means to lower the first piston while the second piston is maintained in raised position in the second cylinder.

3. In a press for shaping and curing pneumatic tires, a diaphragm, upper and lower diaphragm rings attached to the edges of the diaphragm, a cylinder, a piston in the cylinder, a second cylinder located within the first cylinder and carried by the aforesaid piston and a second piston in the second cylinder, the lower diaphragm ring being connected to the first piston and the upper diaphragm ring being connected to the second piston, means to admit fluid pressure to the first cylinder to raise both pistons concurrently, means to admit fluid pressure to the second cylinder to raise the second piston after the first piston has moved to the end of its travel, and means to lower the first piston while pressure is maintained in the second cylinder.

4. In a press for shaping and curing pneumatic tires, a diaphragm, upper and lower diaphragm rings attached to the edges of the diaphragm, a cylinder, a piston in the cylinder, a second cylinder carried by the aforesaid piston and a second piston in the second cylinder, the lower diaphragm ring being connected to the first piston and the upper diaphragm ring being connected to the second piston, means to admit fluid pressure to the lower end of the first cylinder to raise both pistons concurrently, means to admit fluid pressure to the second cylinder to extend the second piston beyond the first piston, and means to admit fluid pressure to the upper end of the first cylinder to lower the first piston while sufficient pressure is maintained in the second cylinder to keep the second piston extended.

5. In a press for shaping and curing pneumatic tires, upper and lower mold sections movable relatively to one another, a diaphragm, upper and lower diaphragm rings attached to the upper and lower edges of the diaphragm, the upper diaphragm ring being in the path of the upper mold section, a cylinder, a piston in the cylinder and connected to the lower diaphragm ring, a second cylinder carried by the aforesaid piston, a second piston in the second cylinder and connected to the upper diaphragm ring, means to admit fluid pressure to opposite ends of the first cylinder to raise and lower both diaphragm rings, means to admit fluid pressure from the first cylinder to the second cylinder to raise the second piston and separate the diaphragm, rings, and a control device to maintain fluid pressure in the second cylinder to hold the second piston in extended position while the first piston is being lowered.

6. In a tire shaping and vulcanizing press, a diaphragm and means to operate the diaphragm comprising a cylinder, a rubber-like piston located in the cylinder and connections from the piston to one edge of the diaphragm, a second cylinder surrounding the first cylinder, a piston connected to the other edge of the diaphragm and movable in the second cylinder, means to admit fluid pressure to opposite ends of the second cylinder to raise and lower the first named cylinder, and a passage to admit fluid pressure from the second cylinder to the first cylinder.

7. In a tire shaping and vulcanizing press, a diaphragm, a first cylinder, a second cylinder of smaller diameter than the first cylinder and located within the first cylinder, a piston in the first cylinder on which the second cylinder is carried, means to arrest upward movement of the first piston while pressure is maintained in the first cylinder, a second piston in the second cylinder, a piston rod operable by the second piston, a passage through the first piston leading to the second cylinder, means to connect the second cylinder with one edge of the diaphragm, and means to connect the piston rod to the other edge of the diaphragm.

References Cited in the file of this patent

UNITED STATES PATENTS

| | | |
|---|---|---|
| 580,848 | Currie | Apr. 20, 1897 |
| 2,465,204 | Dalton | Mar. 22, 1949 |
| 2,495,664 | Soderquist | Jan. 24, 1950 |
| 2,559,119 | Frank | July 3, 1951 |